(12) United States Patent
Zhou

(10) Patent No.: US 10,963,660 B2
(45) Date of Patent: Mar. 30, 2021

(54) METHOD FOR FINGERPRINT COLLECTION AND RELATED PRODUCTS

(71) Applicant: GUANGDONG OPPO MOBILE TELECOMMUNICATIONS CORP., LTD., Guangdong (CN)

(72) Inventor: Yibao Zhou, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 18 days.

(21) Appl. No.: 16/584,959

(22) Filed: Sep. 27, 2019

(65) Prior Publication Data

US 2020/0026900 A1 Jan. 23, 2020

Related U.S. Application Data

(63) Continuation of application No. PCT/CN2018/082212, filed on Apr. 8, 2018.

(30) Foreign Application Priority Data

May 3, 2017 (CN) .......................... 201710305875.6

(51) Int. Cl.
- G06K 9/00 (2006.01)
- G02B 5/20 (2006.01)
- G06K 9/20 (2006.01)

(52) U.S. Cl.
CPC ......... *G06K 9/00013* (2013.01); *G02B 5/208* (2013.01); *G06K 9/001* (2013.01); *G06K 9/00087* (2013.01); *G06K 9/2027* (2013.01)

(58) Field of Classification Search
CPC ............... G06K 9/001; G06K 9/00013; G06K 9/00087; G06K 9/2027; G06K 9/0002; G02B 5/208

See application file for complete search history.

(56) References Cited

U.S. PATENT DOCUMENTS

2004/0252867 A1 12/2004 Lan et al.
2005/0271258 A1 12/2005 Rowe
(Continued)

FOREIGN PATENT DOCUMENTS

| CN | 1620113 | 5/2005 |
|---|---|---|
| CN | 101030245 | 9/2007 |

(Continued)

OTHER PUBLICATIONS

WIPO, ISR for PCT/CN2018/082212, Jun. 27, 2018.
(Continued)

*Primary Examiner* — Abdul-Samad A Adediran
(74) *Attorney, Agent, or Firm* — Hodgson Russ LLP

(57) ABSTRACT

Provided are a method for fingerprint collection and related products. The method includes the following. In response to a receipt of a fingerprint collection instruction, an intensity of each of ambient lights having at least two different frequencies at a current time point is determined via an optical sensor of the terminal. A target frequency is determined, where the target frequency is a frequency of one ambient light having a lowest ambient light intensity among the ambient lights having the at least two different frequencies. Control light emission of an internal light source of an optical fingerprint sensor of the terminal at least according to the target frequency so as to collect fingerprint data via the optical fingerprint sensor.

20 Claims, 10 Drawing Sheets

(56) References Cited

U.S. PATENT DOCUMENTS

2008/0317303 A1    12/2008   Konno et al.
2017/0124370 A1*    5/2017   He ........................ G06K 9/0002

FOREIGN PATENT DOCUMENTS

| | | |
|---|---|---|
| CN | 101276406 | 10/2008 |
| CN | 100533463 | 8/2009 |
| CN | 201438308 | 4/2010 |
| CN | 102360420 | 2/2012 |
| CN | 103329143 | 9/2013 |
| CN | 104200205 | 12/2014 |
| CN | 104361276 | 2/2015 |
| CN | 104392219 | 3/2015 |
| CN | 104951748 | 9/2015 |
| CN | 105045495 | 11/2015 |
| CN | 105184284 | 12/2015 |
| CN | 105302596 | 2/2016 |
| CN | 105809141 | 7/2016 |
| CN | 106095295 | 11/2016 |
| CN | 106326836 | 1/2017 |
| CN | 106453723 | 2/2017 |
| CN | 106527952 | 3/2017 |
| EP | 3131085 | 2/2017 |

OTHER PUBLICATIONS

Rowe et al., "Multispectral Fingerprint Biometrics," Proceedings of the 2005 IEEE Workshop on Information Assurance and Security, 2005, pp. 14-20.

EPO, Office Action for EP Application No. 18793987.1, dated Feb. 10, 2020.

EPO, Communication for EP Application No. 18793987.1, dated Dec. 15, 2020.

* cited by examiner

METHOD FOR FINGERPRINT COLLECTION AND RELATED PRODUCTS

CROSS-REFERENCE TO RELATED APPLICATION(S)

This application is a continuation of International Application No. PCT/CN2018/082212, filed on Apr. 8, 2018, which claims priority to Chinese Patent Application No. 2017103058756, filed on May 3, 2017, the disclosures of which are hereby incorporated by reference in their entireties.

TECHNICAL FIELD

This disclosure relates to the technical field of terminals, and more particularly to a method for fingerprint collection and related products.

BACKGROUND

With the increasing use of terminals such as smart phones, almost everybody has a smart phone. The existing smart phones generally adopt fingerprint recognition technology. The fingerprint recognition technology can be used in unlocking, mobile payment and other functions of the terminals.

Optical fingerprint recognition technology has good stability and high recognition sensitivity, and thus is widely used in fingerprint sensors of various terminals. The optical fingerprint sensor generally includes a light source and an optical fingerprint detection module. An imaging principle of optical fingerprint recognition is as follows. The light source emits lights, and the lights are reflected to the optical fingerprint sensor after passing through a surface of a display screen pressed by a finger. The optical fingerprint sensor receives the reflected lights and converts the reflected lights into fingerprint data for processing, so as to form a fingerprint image. A principle of fingerprint match is as follows. The optical fingerprint sensor matches the formed fingerprint image with a pre-stored fingerprint image to obtain a matching result.

However, the reflected lights received by the optical fingerprint sensor may be easily affected by ambient lights, which may cause errors in the collected fingerprint data, thereby affecting the result of fingerprint matching.

SUMMARY

In implementations of the disclosure, a method for fingerprint collection and related products are provided.

In a first aspect of the disclosure, a method for fingerprint collection is provided. The method includes the following. In response to a receipt of a fingerprint collection instruction, an intensity of each of ambient lights having at least two different frequencies at a current time point is determined via an optical sensor of a terminal. A target frequency is determined, where the target frequency is a frequency of one ambient light having a lowest ambient light intensity among the ambient light having the at least two different frequencies. Control light emission of an internal light source of an optical fingerprint sensor of the terminal at least according to the target frequency so as to collect fingerprint data via the optical fingerprint sensor.

In a second aspect of the disclosure, a terminal is provided. The terminal includes an application processor (AP), an optical sensor, and an optical fingerprint sensor. The optical sensor is configured to detect, in response to a receipt of a fingerprint collection instruction, an intensity of each of ambient lights having at least two different frequencies at a current time point. The AP is configured to determine a target frequency, where the target frequency is a frequency of one ambient light having a lowest ambient light intensity among the ambient lights having the at least two different frequencies. The optical fingerprint sensor includes an internal light source and is configured to collect fingerprint data when the internal light source is controlled by the AP to emit lights at least according to the target frequency.

In a third aspect of the disclosure, a non-transitory computer readable storage medium is provided. The non-transitory computer readable storage medium is configured to store executable program codes which, when executed, are operable with a processor to: determine, in response to a receipt of a fingerprint collection instruction, an intensity of each of ambient lights having at least two different frequencies at a current time point via an optical sensor of the terminal; determine a target frequency, the target frequency being a frequency of one ambient light having a lowest ambient light intensity among the ambient lights having the at least two different frequencies; control light emission of an internal light source of an optical fingerprint sensor of the terminal at least according to the target frequency so as to collect fingerprint data via an optical fingerprint sensor.

BRIEF DESCRIPTION OF THE DRAWINGS

In order to describe technical solutions of implementations of the disclosure or the related art more clearly, the following will give a brief description of accompanying drawings used for describing the implementations of the disclosure or the related art. Apparently, the accompanying drawings described below merely illustrate some implementations of the disclosure. Those of ordinary skill in the art can also obtain other accompanying drawings based on the accompanying drawings described below without creative efforts.

DETAILED DESCRIPTION

In order to enable those skilled in the art to better understand solutions of the disclosure, technical solutions embodied in implementations of the disclosure will be described in a clear and comprehensive manner in conjunction with the accompanying drawings. It is evident that the implementations described herein are merely some rather than all of the implementations of the disclosure. All other implementations obtained by those of ordinary skill in the art based on the implementations of the disclosure without creative efforts shall fall within the protection scope of the disclosure.

The terms "first", "second", and the like used in the specification, the claims, and the accompany drawings of the present disclosure are used to distinguish different objects rather than describe a particular order. The terms "include", "comprise", and "have" as well as variations thereof are intended to cover non-exclusive inclusion. For example, a process, method, system, product, or apparatus including a series of steps or units is not limited to the listed steps or units, on the contrary, it can optionally include other steps or units that are not listed; alternatively, other steps or units inherent to the process, method, product, or device can be included either.

The term "implementation" referred to herein means that a particular feature, structure, or feature described in conjunction with the implementations may be contained in at least one implementation of the present disclosure. The phrase appearing in various places in the specification does not necessarily refer to the same implementation, nor does it refer to an independent or alternative implementation that is mutually exclusive with other implementations. It is expressly and implicitly understood by those skilled in the art that an implementation described herein may be combined with other implementations.

The electronic device involved in the implementations of the present disclosure may include various handheld devices, in-vehicle devices, wearable devices, computing devices that have wireless communication functions or other processing devices connected to the wireless modem, as well as various forms of user equipment (UE), mobile stations (MS), terminal devices, and the like. For the convenience of description, the devices mentioned above are collectively referred to as terminals.

The following will describe the technical solutions of the disclosure in detail.

Figure 1A:
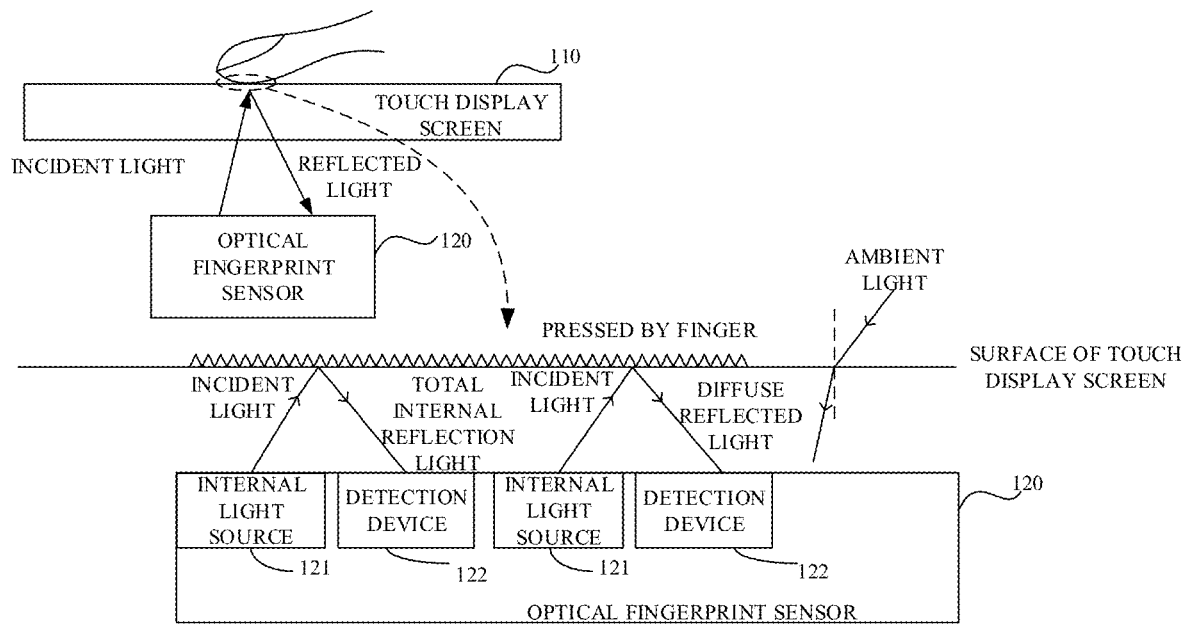
FIG. 1A is a schematic diagram illustrating a work principle of an optical fingerprint sensor according to an implementation of the disclosure.

To better understand implementations of the disclosure, a work principle of an optical fingerprint sensor provided in the implementations of the present disclosure is introduced first. FIG. 1A is a schematic diagram illustrating a work principle of an optical fingerprint sensor according to an implementation of the disclosure. In FIG. 1A, a touch display screen 110 and an optical fingerprint sensor 120 are illustrated. The optical fingerprint sensor 120 includes an internal light source 121 and a detection device 122. The detection device 122 may be an array of charge-coupled devices (CCDs). In one example, the optical fingerprint sensor 120 includes at least one internal light source 121 and at least one detection device 122. The internal light source 121 can emit lights, which can be referred to as incident lights. The incident lights are reflected by an area of the touch display screen in contact with a finger. Reflected lights may be received and converted into electrical signal data by the detection device 122. According to the total internal reflection (TIR) principle, the optical fingerprint sensor 120 can determine which incident lights are in contact with convex portions of a fingerprint (i.e., ridges of the fingerprint) of the finger, and which incident lights are in contact with a concave part of the fingerprint (i.e., valleys of the fingerprint).

As illustrated in an enlarged area indicated by dotted lines in FIG. 1A, the ridges of the fingerprint are in contact with the surface of the touch display screen 110, and the valleys of the fingerprint are not in contact with the surface of the touch display screen 110. On one hand, when the incident lights generated by the optical fingerprint sensor 120 reach the valleys of the fingerprint, the incident lights reach a surface of the touch display screen 110 that is in contact with air. In this case, total reflection of the incident lights can be achieved by designing incident angles of the incident lights (a refractive index of a material of the touch display screen 110 is greater than 1, and a refractive index of the air is approximately equal to 1, and thus the total reflection of the incident lights can be achieved by setting the refractive index of the material of the touch display screen 110 be greater than that of the air). In this way, the optical fingerprint sensor 120 can receive a total internal reflection light of a high intensity. On the other hand, when incident lights generated by the optical fingerprint sensor 120 reach the ridges of the fingerprint, the incident lights reach the surface of the touch display screen 110 that is in contact with the convex portions of the fingerprint. In this situation, diffuse reflection occurs at the convex portions of the fingerprint, and the optical fingerprint sensor 120 can receive a diffuse reflected light having a low intensity. Thereafter, the optical fingerprint sensor 120 can form a fingerprint image according to received lights of different intensities. Since the refractive index of the material of the touch display screen 110 is greater than that of the air, the ambient lights can easily enter the optical fingerprint sensor 120 by passing through the touch display screen 110, which may interfere with the reflected light received by the optical fingerprint sensor 120.

Figure 1B:
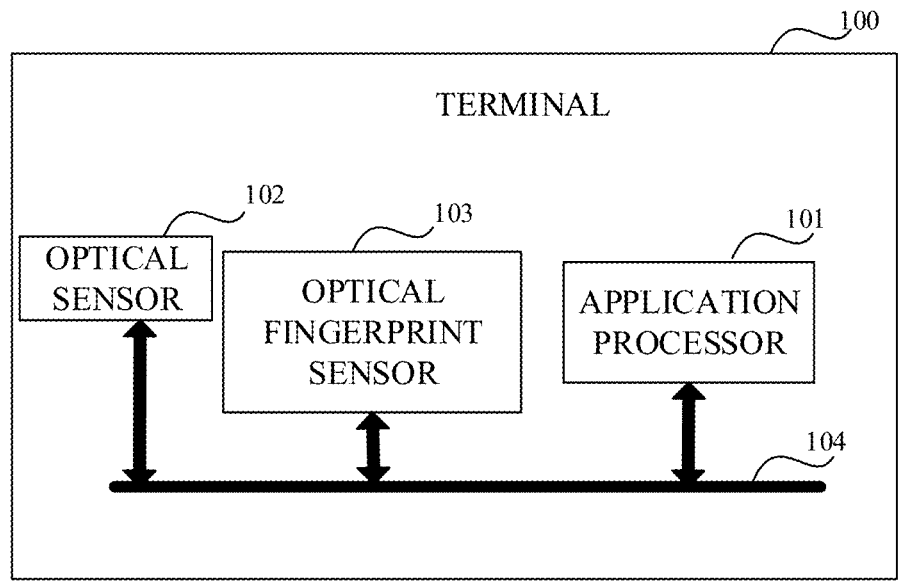
FIG. 1B is a schematic structural diagram illustrating a terminal according to an implementation of the disclosure.

FIG. 1B is a schematic structural diagram illustrating a terminal according to an implementation of the disclosure. As illustrated in FIG. 1B, the terminal 100 includes an application processor (AP) 101, an optical sensor 102, and an optical fingerprint sensor 103. The optical fingerprint sensor 103 includes an internal light source 1031 (not illustrated in FIG. 1B). The AP 101 is coupled with the optical sensor 102 and the optical fingerprint sensor 103 via a bus 104.

The optical sensor 102 is configured to detect an intensity of each of ambient lights having at least two different frequencies among ambient lights at a current time point when the terminal 100 receives a fingerprint collection instruction, and send the intensity of each of the ambient lights having the at least two different frequencies to the AP.

In one example, the fingerprint collection instruction may be input in response to a user's input or may be generated in response to a user's touch on a touch display screen. The touch display screen sends a fingerprint collection instruction to the AP 101 of the terminal 100. When the terminal 100 receives the fingerprint collection instruction, the optical sensor 102 is controlled to detect the intensity of each of the ambient lights having the at least two different frequencies among the ambient lights at the current time point and to send the intensity of each of the ambient lights having the at least two different frequencies to the AP. The optical sensor 102 can detect the intensity of each of the ambient lights having the at least two different frequencies. For example, the optical sensor 102 can detect an ambient light intensity of red light having a wavelength of 630 nm and an ambient light intensity of green light having a wavelength of 520 nm among the ambient lights at the current time point. According to the implementations of the disclosure, the intensity of each of ambient lights having different frequencies can be detected by the optical sensor 102, which can reduce the influence of a light of a certain frequency among the ambient lights on fingerprint data collected by the optical fingerprint sensor 103, where the light of the certain frequency has a high intensity.

The AP 101 is configured to determine a target frequency, where the target frequency is a frequency of one ambient light having a lowest ambient light intensity among the ambient lights having the at least two different frequencies.

The optical fingerprint sensor 103 is configured to collect fingerprint data when the internal light source is controlled by the AP to emit lights at least according to the target frequency.

In the implementation of the disclosure, the optical fingerprint sensor 103 collects the fingerprint data in case that the internal light source is controlled by the AP to emit the lights at least according to the frequency of the one ambient light having the lowest ambient light intensity among the ambient lights having the at least two different frequencies. In this way, it is possible to minimize the influence of the ambient lights on the fingerprint data collected by the optical fingerprint sensor 103, thereby improving an accuracy of the fingerprint data obtained by the optical fingerprint collection.

In one implementation, the AP 101 is further configured to determine the lowest ambient light intensity among intensities of the ambient lights having the at least two different frequencies.

In one implementation, the AP 101 is further configured to obtain a target light source intensity corresponding to the lowest ambient light intensity according to a correspondence relationship between ambient light intensities and light source intensities.

In one implementation, the optical fingerprint sensor 103 configured to collect the fingerprint data when the internal light source is controlled by the AP to emit the lights at least according to the target frequency is configured to collect the fingerprint data when the internal light source is controlled to emit the lights according to the target frequency and the target light source intensity.

In one example, the optical sensor 102 detects that an intensity of an ambient light having a first frequency at a current time point is 100 candela (cd), an intensity of an ambient light having a second frequency is 150 cd, and an intensity of an ambient light having a third frequency is 200 cd, then the ambient light having the first frequency is an ambient light of the lowest intensity, and the ambient light of the lowest intensity has the intensity of 100 cd. After the AP 101 determines that the lowest ambient light intensity is 100 cd, the AP 101 can further obtains the target light source intensity corresponding to the lowest ambient light intensity according to the correspondence relationship between the ambient light intensities and the light source intensities.

In one example, the correspondence relationship between the ambient light intensities and the light source intensities may be pre-stored in a memory of the terminal, such as a non-transitory memory. Generally, the ambient light intensities have a positive correlation with the light source intensities, the higher an ambient light intensity, the higher a corresponding light source intensity, and a light source intensity is higher than a corresponding ambient light intensity. For example, the corresponding relationship between the ambient light intensities and the light source intensities can be set as a proportion relationship, for instance, a ratio of an ambient light intensity to a corresponding light source intensity is 1:4. As an example, if an ambient light intensity is 50 cd, a corresponding light source intensity is 200 cd. As another example, if an ambient light intensity is 100 cd, a corresponding light source intensity is 400 cd. It is to be noted that the above light intensities are obtained according to normalized processing having the same standard. The ambient light can be deemed as noise. In order to prevent noise from covering up real fingerprint data, it needs to ensure that an intensity of a light emitted by the internal light source 1031 is much higher than that of the ambient light, and in this way, the accuracy of the collected fingerprint data can be improved. In general, the greater a difference between the ambient light intensity and the intensity of the light emitted by the internal light source 1031, the higher the accuracy of the fingerprint data collected by the optical fingerprint sensor 103. Due to a limitation caused by a power of the internal light source 1031, the intensity of the light emitted by the internal light source 1031 is generally adjusted to be maximum when the ambient light is strong.

In one example, if the optical sensor 102 detects, among the ambient lights, that an intensity of a red light having a wavelength of 630 nm at the current time point is 100 cd, an intensity of a green light having a wavelength of 520 nm at the current time point is 200 cd, and an intensity of a blue light having a wavelength of 450 nm at the current time point is 150 cd, the AP 101 may determine that the lowest ambient light intensity among the intensities of the ambient lights having the above three frequencies is 100 cd, and then according to the correspondence relationship between the ambient light intensities and the light source intensities, the AP 101 determines that the target light source intensity corresponding to the lowest ambient light intensity 100 cd is 400 cd. Thereafter, the internal light source 1031 of the optical fingerprint sensor 103 is controlled to emit a light having a wavelength of 630 nm and an intensity of 400 cd so as to collect the fingerprint data. Since the intensity and frequency of the light emitted by the internal light source 1031 of the optical fingerprint sensor 103 can minimize the interference generated by the ambient lights, such that the accuracy of the fingerprint data collected by the optical fingerprint collection can be improved.

In one implementation, the AP 101 is further configured to determine whether a match between the fingerprint data and preset fingerprint template data exists, and determine that a fingerprint verification succeeds in response to the match between the fingerprint data and the preset fingerprint template data.

In one example, the preset fingerprint template data may be pre-stored in the non-transitory memory of the terminal and can be collected by the optical fingerprint sensor 103 in advance.

In one implementation, the AP 101 is further configured to determine whether a total intensity of the ambient lights at the current time point is lower than a preset intensity, and detect whether the current time point falls within a preset night-time interval based on a determination that the total intensity of the ambient lights at the current time point is lower than the preset intensity.

The optical fingerprint sensor 103 is further configured to collect the fingerprint data when the internal light source 1031 is controlled by the AP to emit the lights at least according to the target frequency, upon detecting that the current time point falls within the preset night-time interval.

The preset intensity may be set in advance and stored in the non-transitory memory of the terminal. The preset intensity can be set to be brightness at dusk. Generally, when the total intensity of the ambient lights at the current time point is lower than the preset intensity, it is considered that the ambient light intensity at the current time point is low, and the AP 101 further determines whether the current time point falls within the preset night-time interval. The preset night-time interval referred to herein may be an interval from 19:00 pm to 6:00 am. In one example, when the current time point falls within the preset night-time interval, it can indicate that at the current time point an actual ambient light intensity is low. When the ambient light intensity detected by the optical sensor 102 is low, it is considered that the ambient light intensity detected at the current time point by optical sensor 102 is accurate and the optical fingerprint sensor 103 collects fingerprint data when the internal light source is controlled by the AP to emit the lights at least according to the target frequency. According to the implementations of the disclosure, the ambient light intensity at the current time point and the current time point can be used to determine whether the ambient light intensity detected at the current time point is accurate, and therefore the accuracy of the fingerprint data obtained by the optical fingerprint collection can be further improved.

Figure 1C:
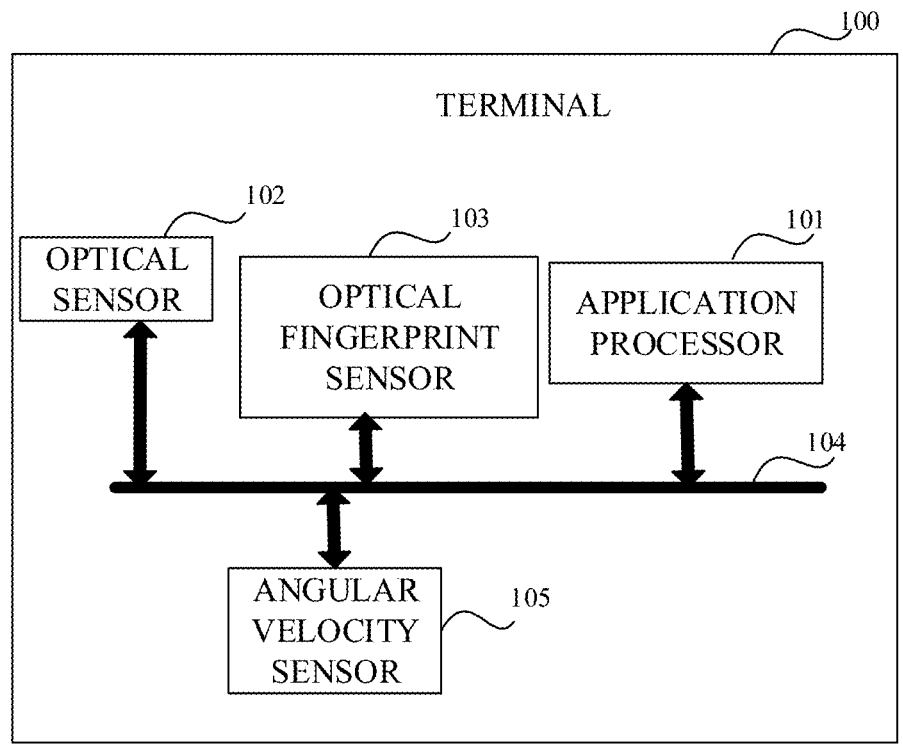
FIG. 1C is a schematic structural diagram illustrating a terminal according to another implementation of the disclosure.

As illustrated in FIG. 1C, the terminal further includes an angular velocity sensor 105. The angular velocity sensor 105 is configured to measure an angular velocity of the terminal upon detecting that the current time point fails to fall within the preset night-time interval. The AP 101 is further configured to skip execution of performing the control on the internal light source of the optical fingerprint sensor 103, when the angular velocity of the terminal detected by the angular velocity sensor 105 is higher than a preset angular velocity. The AP is further configured to perform the control on the internal light source when the angular velocity of the mobile terminal detected by the angular velocity sensor 105 is lower than or equal to the preset angular velocity.

When the current time point fails to fall within the preset night-time interval, it indicates that the ambient light intensity detected at the current time point does not match the actual ambient light intensity at the current time point, and thus whether the terminal is in motion is detected by measuring the angular velocity of the terminal with the angular velocity sensor 105. For example, if the current time point is daytime, the terminal is in motion, and the ambient light intensity at the current time point is low, it can be considered that the terminal is in a user's pocket or bag, and the fingerprint collection instruction received by the terminal are likely to be generated by unintended triggering, and then the AP 101 skips execution of the fingerprint collection instruction. According to the implementations of the disclosure, when the ambient light intensity detected at the current time point does not match the actual ambient light intensity at the current time point, determine whether the fingerprint collection instruction received by the terminal is triggered by mistake. When the fingerprint collection instruction is generated by unintended triggering, the fingerprint collection instruction is not executed. According to the implementations of the disclosure, the fingerprint collection triggered unintentionally can be avoided, and therefore the internal light source of the optical fingerprint sensor 103 does not need to be triggered to work, thereby reducing power consumption of the optical fingerprint sensor 103.

Figure 1D:
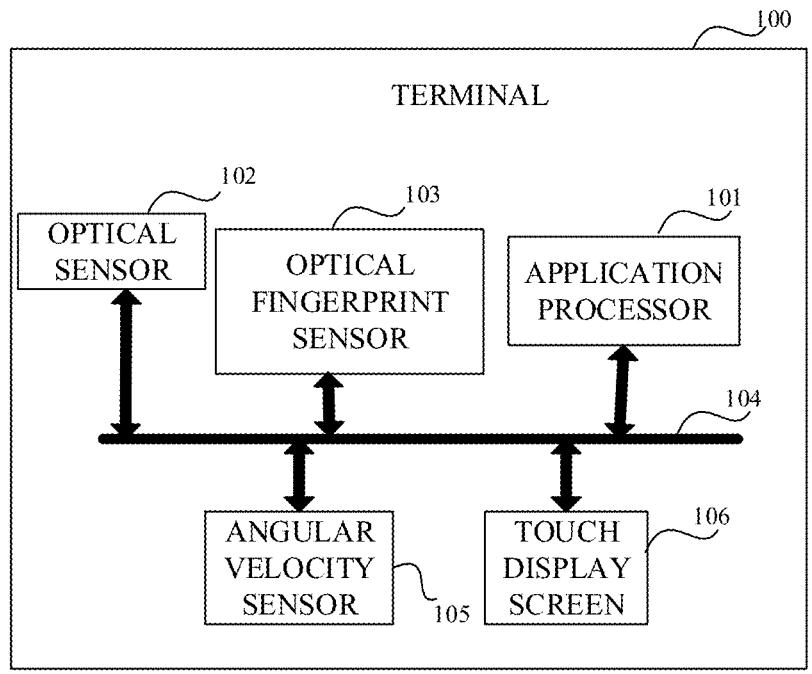
FIG. 1D is a schematic structural diagram illustrating a terminal according to another implementation of the disclosure.
Figure 1E:
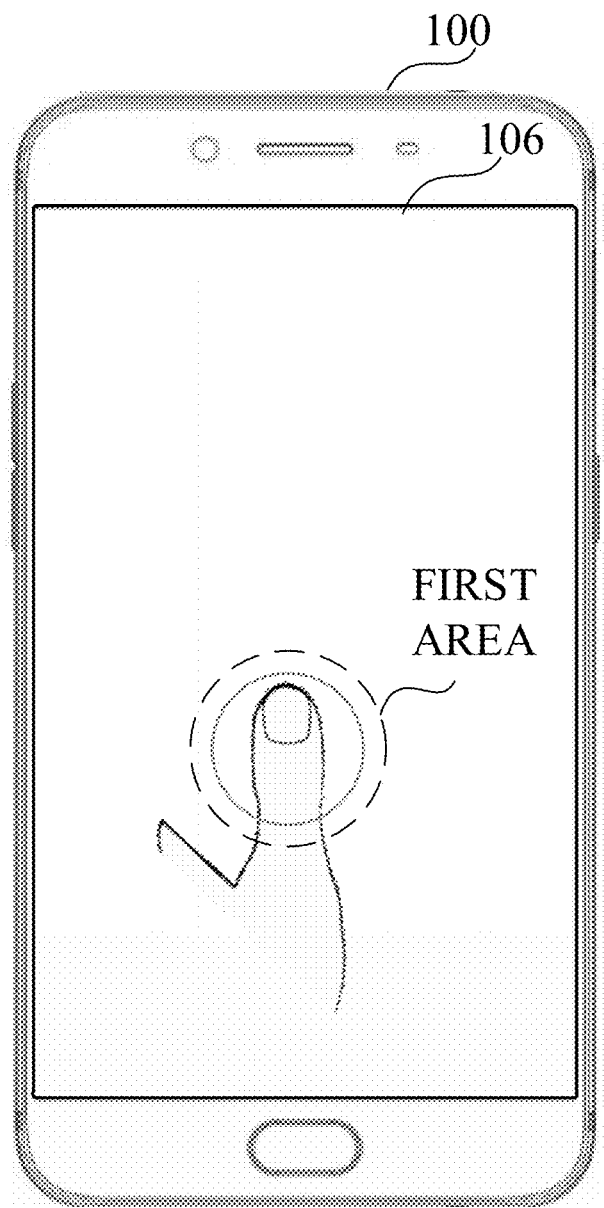
FIG. 1E is a schematic structural diagram illustrating a fingerprint recognition area according to an implementation of the disclosure.

As illustrated in FIG. 1D, the terminal further includes a touch display screen 106.

In one example, a fingerprint recognition area of the optical fingerprint sensor is in a first area of the touch display screen 106. The fingerprint collection instruction is generated in response to a user's touch operation on the first area detected by the touch display screen 106.

In one example, when the first area of the touch display screen 106 is touched by the user, the fingerprint collection instruction is generated. The first area may be any preset area of the touch display screen 106. The preset area may be at any position of the touch display screen 106, such as the upper left side (as illustrated in FIG. 1 *e*), the upper side, the lower side, the left side, or the right side. The preset area has a size sufficient to be covered by a fingerprint area of the finger. There is no restriction on the shape of the preset area. The preset area may have a circle shape, an ellipse shape, a quadrilateral (e.g. rectangular) shape, a fingerprint-like shape, or the like.

In one example, the touch display screen 106 may be a thin film transistor-liquid crystal display (TFT-LCD), a light emitting diode (LED) display screen, an organic light-emitting diode (OLED) display screen and the like.

In one example, the touch display screen 106 may include a touch screen and a display screen. The touch screen and the display screen are stacked together, and the display screen is disposed below the touch screen.

According to the implementations of the disclosure, during the fingerprint collection, the internal light source of the optical fingerprint sensor controlled by the AP does not to emit the lights of the same frequency. Instead, the work frequency of the internal light source can be adjusted according to the intensity of each of the ambient lights having different frequencies, such that the influence of the ambient lights on the optical fingerprint collection can be reduced, thereby improving the accuracy of fingerprint data collected via the optical fingerprint collection.

Figure 2:
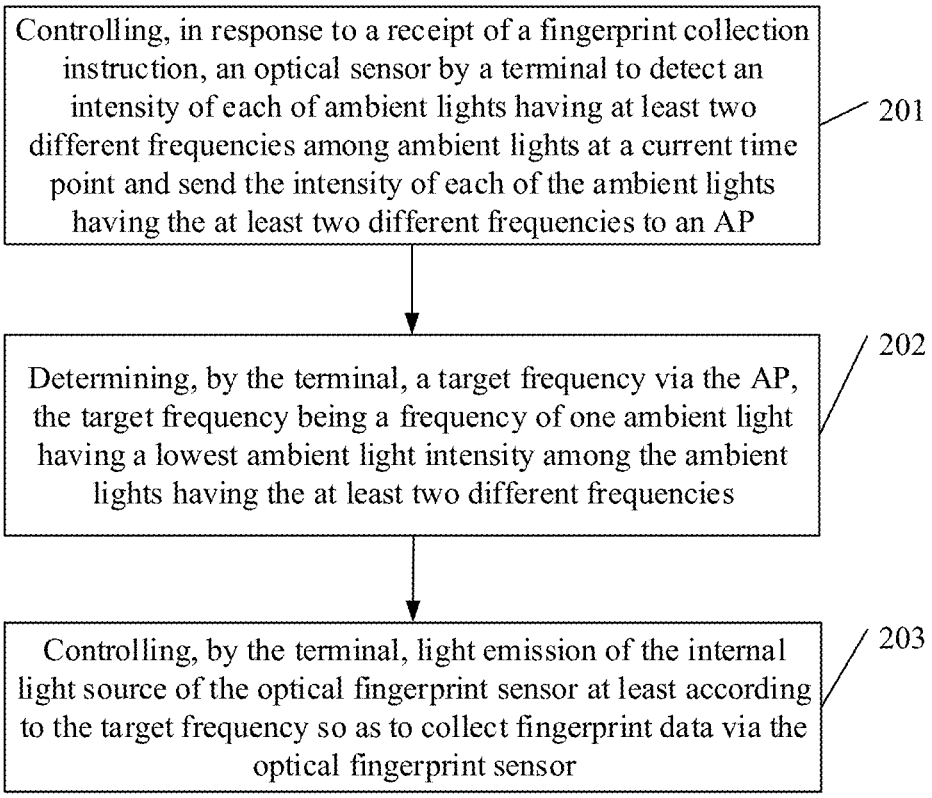
FIG. 2 is a schematic flowchart illustrating a method for fingerprint collection according to an implementation of the disclosure.

FIG. 2 is a schematic flowchart illustrating a method for fingerprint collection according to an implementation of the disclosure. As illustrated in FIG. 2, the method is applicable to a terminal including an application processor (AP), an optical sensor, and an optical fingerprint sensor. The optical fingerprint sensor includes an internal light source. As illustrated in FIG. 2, the method begins at block 201.

At block 201, when the terminal receives a fingerprint collection instruction, the terminal controls the optical sensor to detect an intensity of each of ambient lights having at least two different frequencies among ambient lights at a current time point and to send the intensity of each of the ambient lights having the at least two different frequencies to the AP.

At block 202, the terminal determines a target frequency via the AP, where the target frequency is a frequency of one ambient light having a lowest ambient light intensity among the ambient lights having the at least two different frequencies.

At block 203, the terminal control light emission of the internal light source of the optical fingerprint sensor at least according to the target frequency so as to collect fingerprint data via the optical fingerprint sensor.

According to the implementation of the disclosure, when the terminal performs fingerprint collection, the control is performed on the internal light source to emit the lights at least according to the frequency of one ambient light having the lowest ambient light intensity among the ambient lights having the at least two different frequencies so as to collect fingerprint data via the optical fingerprint sensor, which can minimize the influence of the ambient lights on the fingerprint data collected by the optical fingerprint sensor 103, thereby improving the accuracy of the fingerprint data obtained via the optical fingerprint collection.

Figure 3:
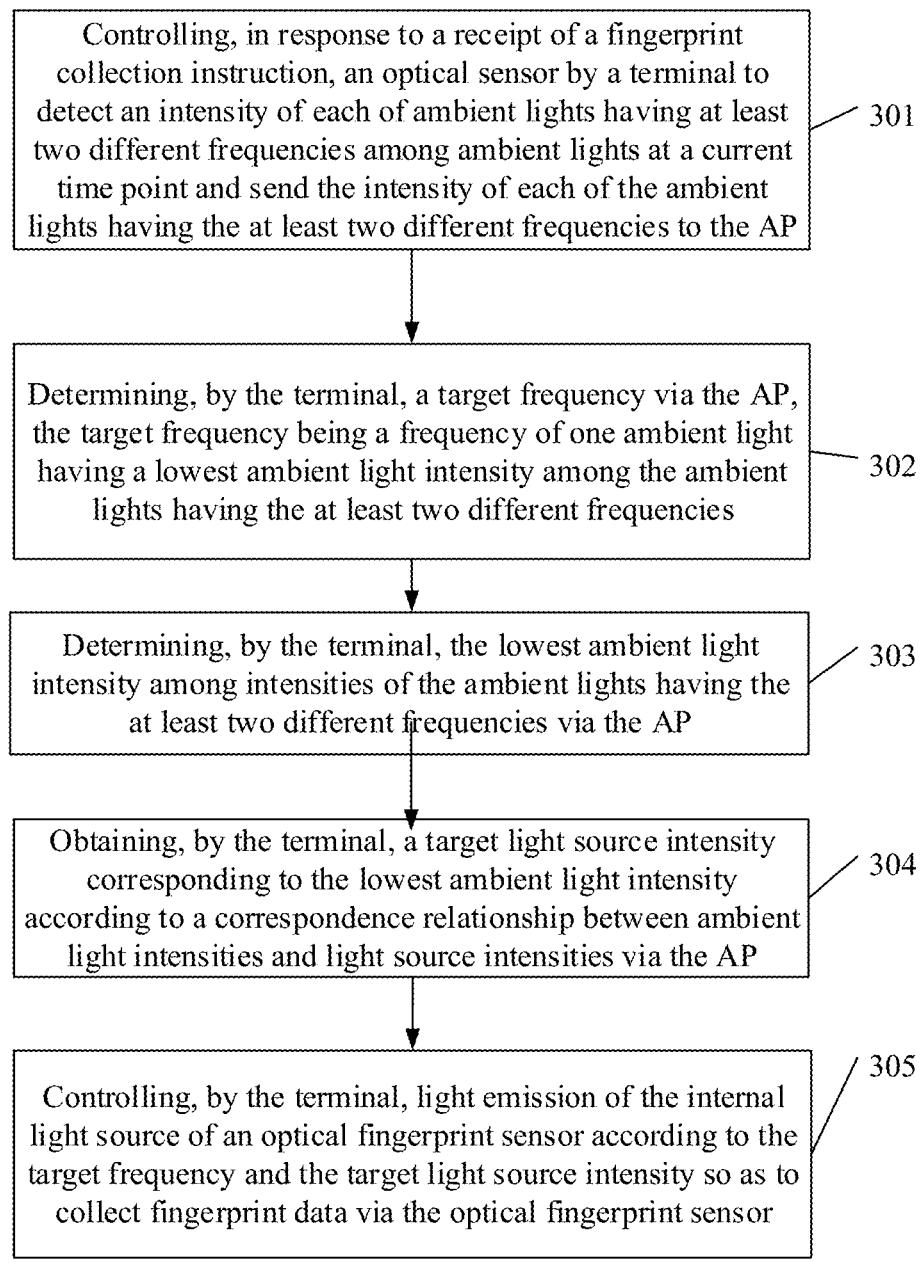
FIG. 3 is a schematic flowchart illustrating a method for fingerprint collection according to another implementation of the disclosure.

FIG. 3 is a schematic flowchart illustrating a method for fingerprint collection according to another implementation of the disclosure. As illustrated in FIG. 3, the method is applicable to a terminal including an application processor (AP), an optical sensor, and an optical fingerprint sensor. The optical fingerprint sensor includes an internal light source. As illustrated in FIG. 3, the method begins at block 301.

At block 301, when the terminal receives a fingerprint collection instruction, the terminal controls the optical sensor to detect an intensity of each of ambient lights having at least two different frequencies among ambient lights at a current time point and to send the intensity of each of the ambient lights having the at least two different frequencies to the AP.

At block 302, the terminal determines a target frequency via the AP, where the target frequency is a frequency of one ambient light having a lowest ambient light intensity among the ambient lights having the at least two different frequencies.

At block 303, the terminal determines, via the AP, the lowest ambient light intensity among intensities of the ambient lights having the at least two different frequencies.

At block 304, the terminal obtains, via the AP, a target light source intensity corresponding to the lowest ambient light intensity according to a correspondence relationship between ambient light intensities and light source intensities.

At block 305, the terminal controls light emission of the internal light source of the optical fingerprint sensor according to the target frequency and the target light source intensity so as to collect the fingerprint data via the optical fingerprint sensor.

According to the implementation of the disclosure, when the terminal performs fingerprint collection, the control is performed on the internal light source to emit the lights according to the frequency of one ambient light having the lowest ambient light intensity among the ambient lights having the at least two different frequencies, and the intensity corresponding to the lowest ambient light intensity among the intensities of the ambient lights having the at least two different frequencies so as to collect the fingerprint data via the optical fingerprint sensor, such that the influence of the ambient light on the fingerprint data collected by the optical fingerprint sensor can be reduced, thereby improving the accuracy of the fingerprint data obtained by the optical fingerprint collection.

Figure 4:
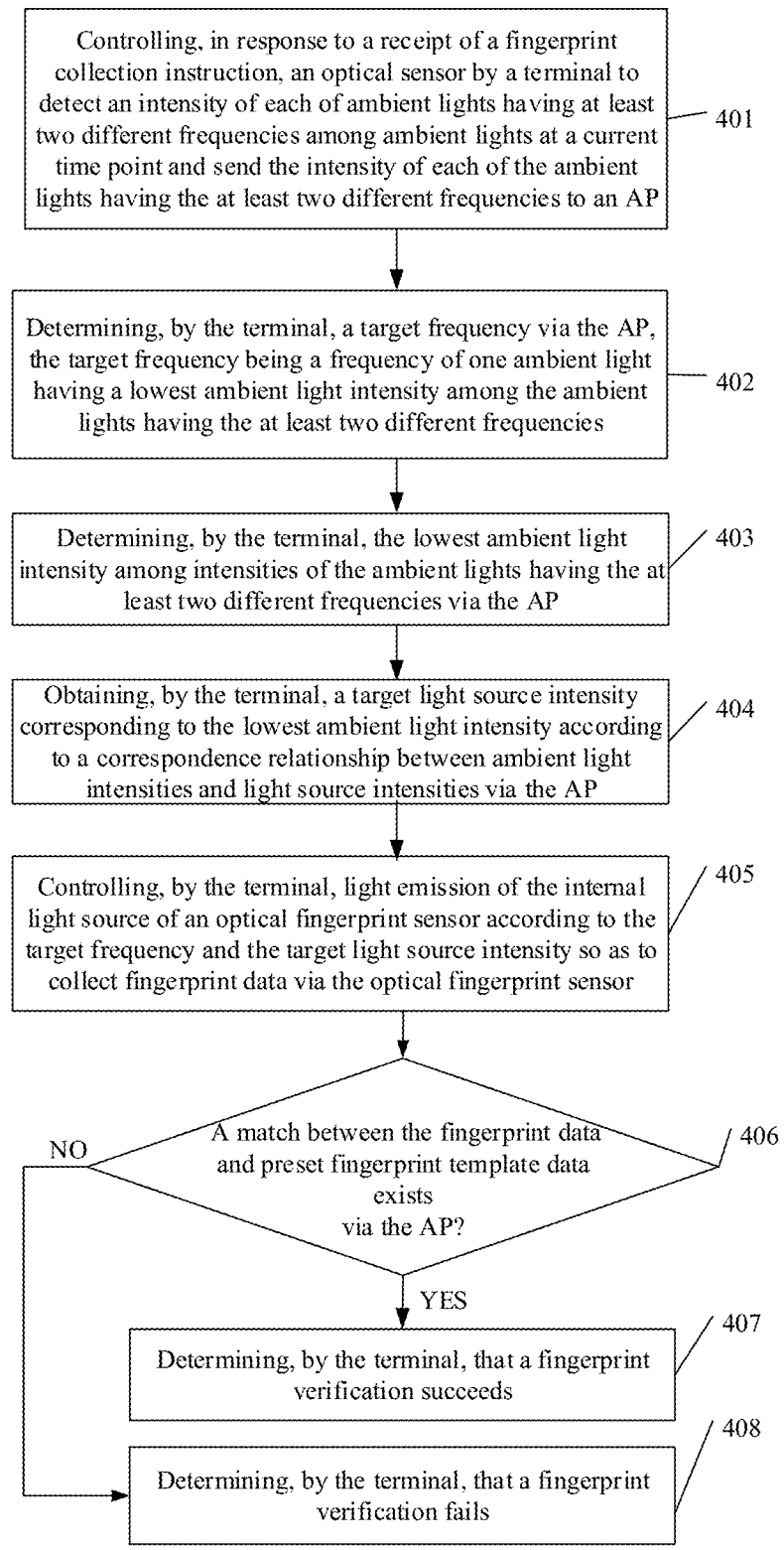
FIG. 4 is a schematic flowchart illustrating a method for fingerprint collection according to another implementation of the disclosure.

FIG. 4 is a schematic flowchart illustrating a method for fingerprint collection according to another implementation of the disclosure. As illustrated in FIG. 4, the method is applicable to a terminal including an application processor (AP), an optical sensor, and an optical fingerprint sensor. The optical fingerprint sensor includes an internal light source. As illustrated in FIG. 4, the method begins at block 401.

At block 401, when the terminal receives a fingerprint collection instruction, the terminal controls the optical sensor to detect an intensity of each of ambient lights having at least two different frequencies among ambient lights at a current time point and to send the intensity of each of the ambient lights having the at least two different frequencies to the AP.

At block 402, the terminal determines a target frequency via the AP, where the target frequency is a frequency of one ambient light having the lowest ambient light intensity among the ambient lights having the at least two different frequencies.

At block 403, the terminal determines the lowest ambient light intensity among intensities of the ambient lights having the at least two different frequencies via the AP.

At block 404, the terminal obtains a target light source intensity corresponding to the lowest ambient light intensity according to a correspondence relationship between ambient light intensities and light source intensities via the AP.

At block 405, the terminal control light emission of the internal light source of the optical fingerprint sensor according to the target frequency and the target light source intensity.

At block 406, the terminal determines, via the AP, whether the fingerprint data matches preset fingerprint template data. If yes, proceed to operations at block 407, and otherwise, proceed to operations at block 408.

At block 407, the terminal determines that a fingerprint verification succeeds.

At block 408, the terminal determines that the fingerprint verification fails.

According to the implementation of the disclosure, when the terminal performs fingerprint collection, the control is performed on the internal light source to emit the lights according to the frequency of one ambient light having the lowest ambient light intensity among the ambient lights having the at least two different frequencies, and the intensity corresponding to the lowest ambient light intensity among the intensities of the ambient lights having the at least two different frequencies so as to collect the fingerprint data via the optical fingerprint sensor, such that the influence of the ambient light on the fingerprint data collected by the optical fingerprint sensor can be reduced as much as possible, and the accuracy of the fingerprint data obtained by the optical fingerprint collection can be improved, thereby improving a success rate of fingerprint matching.

Figure 5:
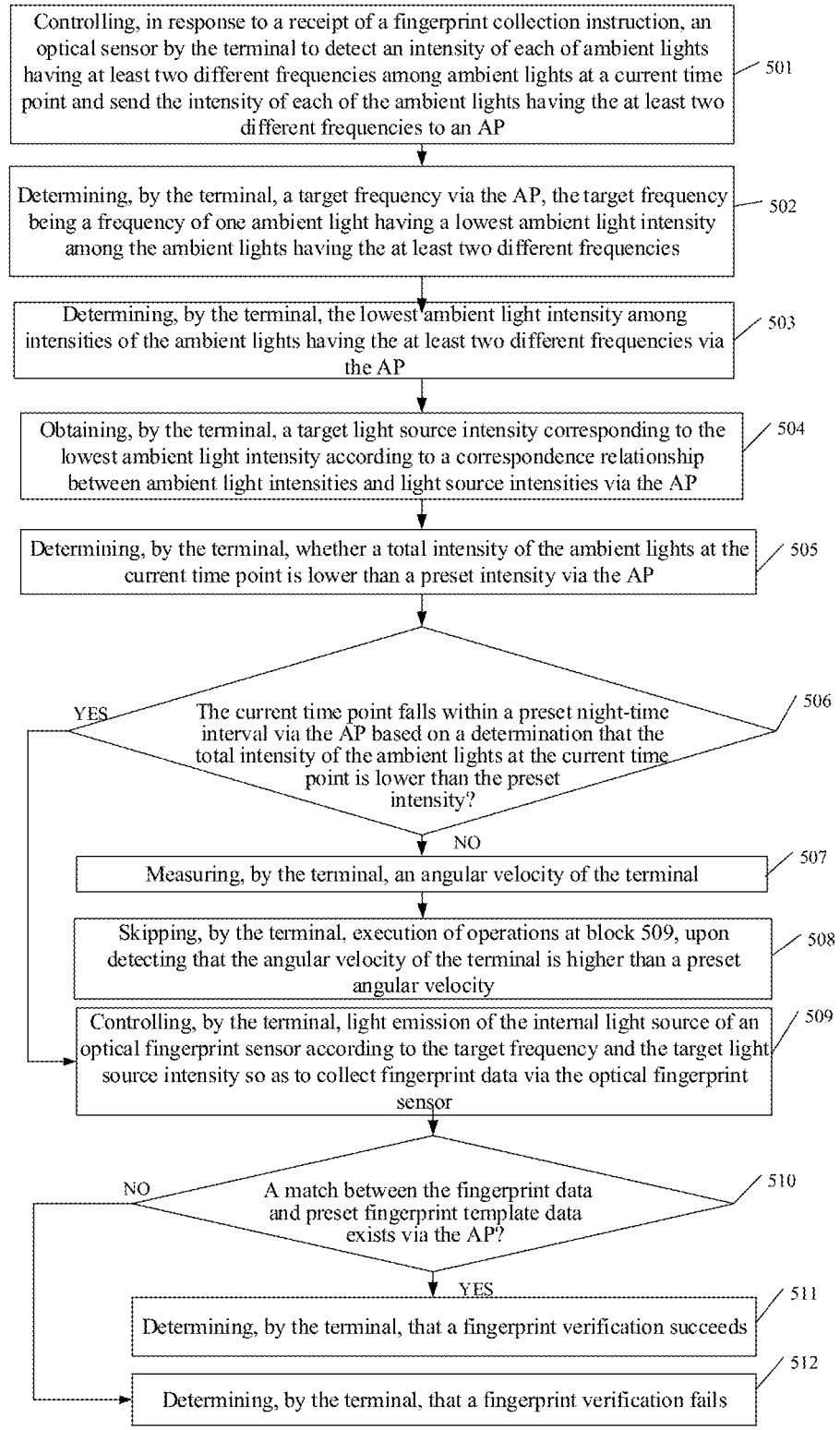
FIG. 5 is a schematic flowchart illustrating a method for fingerprint collection according to another implementation of the disclosure.

FIG. 5 is a schematic flowchart illustrating a method for fingerprint collection according to another implementation of the disclosure. As illustrated in FIG. 5, the method is applicable to a terminal including an application processor (AP), an optical sensor, and an optical fingerprint sensor. The optical fingerprint sensor includes an internal light source. The method begins at block 501.

At block 501, when the terminal receives a fingerprint collection instruction, the terminal controls the optical sensor to detect an intensity of each of ambient lights having at least two different frequencies among ambient lights at a current time point and to send the intensity of each of the ambient lights having the at least two different frequencies to the AP.

At block 502, the terminal determines a target frequency via the AP, where the target frequency is a frequency of one ambient light having the lowest ambient light intensity among the ambient lights having the at least two different frequencies.

At block 503, the terminal determines the lowest ambient light intensity among intensities of the ambient lights having the at least two different frequencies via the AP.

At block 504, the terminal obtains a target light source intensity corresponding to the lowest ambient light intensity according to a correspondence relationship between ambient light intensities and light source intensities via the AP.

At block 505, the terminal determines, via the AP, whether a total intensity of the ambient lights at the current time point is lower than a preset intensity.

At block 506, the terminal detects, via the AP, whether the current time point falls within a preset night-time interval based on a determination that the total intensity of the ambient lights at the current time point is lower than the preset intensity. If yes, proceed to operations at block 509, and otherwise, proceed to operations at block 507.

At block 507, the terminal measures an angular velocity of the terminal via an angular velocity sensor.

At block 508, the terminal skips execution of operations at block 509 and the processes ends, upon detecting that the angular velocity of the terminal is higher than a preset angular velocity.

At block 509, the terminal controls light emission of the internal light source of the optical fingerprint sensor according to the target frequency and the target light source intensity so as to collect the fingerprint data via the optical fingerprint sensor.

At block 510, the terminal determines, via the AP, whether the fingerprint data matches preset fingerprint template data. If yes, proceed to operations at block 511, and otherwise, proceed to operations at block 512.

At block 511, the terminal determines that a fingerprint verification succeeds.

At block 512, the terminal determines that the fingerprint verification fails.

According to the implementation of the disclosure, when the terminal performs fingerprint collection, the control is performed on the internal light source to emit lights according to the frequency of one ambient light which has the lowest ambient light intensity among the ambient lights having the at least two different frequencies, and the intensity corresponding to the lowest ambient light intensity among the intensities of the ambient lights having the at least two different frequencies so as to collect the fingerprint data via the optical fingerprint sensor, such that the influence of the ambient light on the fingerprint data collected by the optical fingerprint sensor can be reduced as much as possible, and the accuracy of the fingerprint data obtained by the optical fingerprint collection can be improved, thereby improving a success rate of fingerprint matching. In this way, the fingerprint collection triggered unintentionally can be avoided, and therefore the internal light source of the optical fingerprint sensor does not need to be triggered to work, thereby reducing the power consumption of the optical fingerprint sensor.

Figure 6:
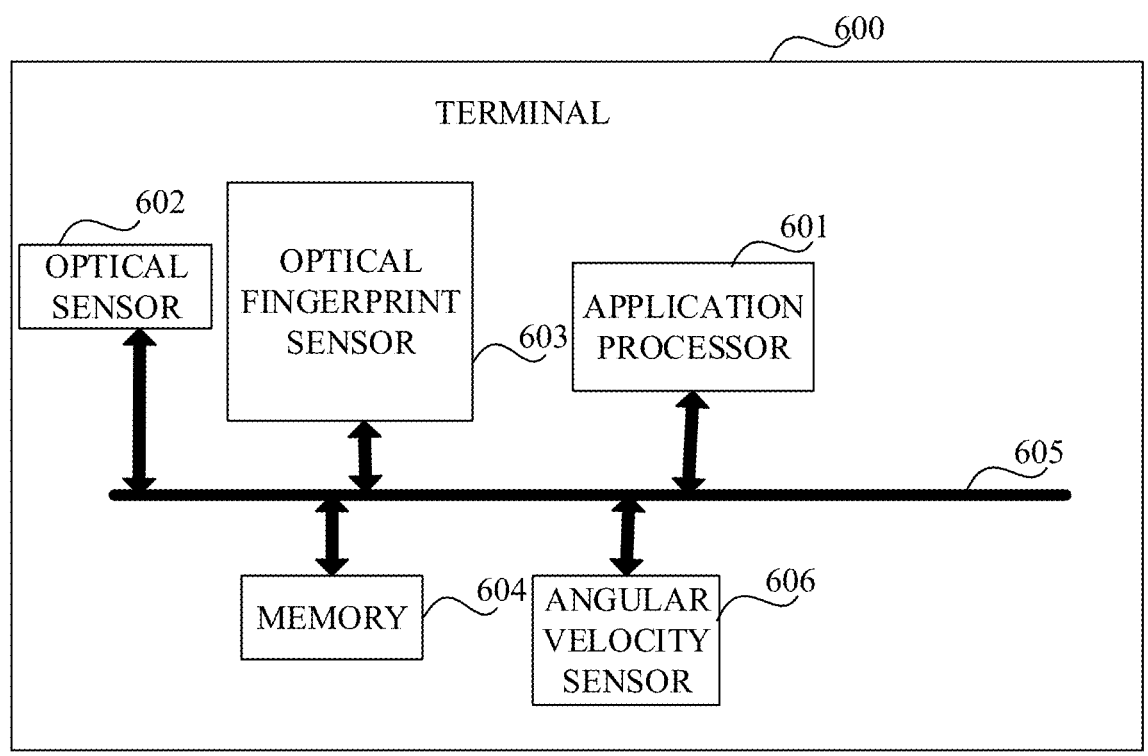
FIG. 6 is a schematic structural diagram illustrating a terminal according to another implementation of the disclosure.

FIG. 6 is a schematic structural diagram illustrating a terminal according to another implementation of the disclosure. The terminal 600 includes an application processor (AP) 601, an optical sensor 602, an optical fingerprint sensor 603, and a memory 604 configured to store one or more programs. The optical fingerprint sensor 603 includes an internal light source. The AP 601 is coupled with the optical sensor 602, the optical fingerprint sensor 603, and the memory 604 via a bus 104.

In one implementation, the one or more programs are configured to be performed by the AP 601. The one or more programs include instructions configured to: control, in response to a receipt of a fingerprint collection instruction, the optical sensor 602 to detect an intensity of each of ambient lights having at least two different frequencies among ambient lights at a current time point and to send the intensity of each of the ambient lights having the at least two different frequencies to the AP 601; determine a target frequency via the AP 601, where the target frequency is a frequency of one of the ambient lights having the at least two different frequencies and the one of the ambient lights has the lowest ambient light intensity among ambient lights having the at least two different frequencies; control light emission of the internal light source of the optical fingerprint sensor 603 at least according to the target frequency so as to collect fingerprint data via the optical fingerprint sensor 603.

In one implementation, the one or more programs further include instructions configured to: determine, via the AP 601, the lowest ambient light intensity among intensities of the ambient lights having the at least two different frequencies; obtain, via the AP 601, a target light source intensity corresponding to the lowest ambient light intensity according to a correspondence relationship between ambient light intensities and light source intensities. The one or more programs configured to control the light emission of the internal light source of the optical fingerprint sensor 603 at least according to the target frequency is configured to control the light emission of the internal light source of the optical fingerprint sensor 603 according to the target frequency and the target light source intensity.

In one implementation, the one or more programs further include instructions configured to: determine, via the AP 601, whether a match between the fingerprint data and preset fingerprint template data exists; determine that a fingerprint verification succeeds in response to the match between the fingerprint data and the preset fingerprint template data.

In one implementation, the one or more programs further include instructions configured to: determine, via the AP 601, whether a total intensity of the ambient lights at the current time point is lower than a preset intensity; detect, via the AP 601, whether the current time point falls within a preset night-time interval based on a determination that the total intensity of the ambient lights at the current time point is lower than the preset intensity; control the light emission of the internal light source of the optical fingerprint sensor 603 at least according to the target frequency, when the current time point falls within the preset night-time interval.

In one implementation, the terminal further includes an angular velocity sensor 606. The one or more programs further include instructions configured to: measure, via the angular velocity sensor 606, an angular velocity of the terminal when the current time point fails to fall within the preset night-time interval; skip execution of controlling the light emission of the internal light source of the optical fingerprint sensor 603 at least according to the target frequency, when the angular velocity of the terminal is higher than a preset angular velocity.

According to the implementation of the disclosure, the control is performed on the internal light source to emit lights at least according to the frequency of one ambient light having the lowest ambient light intensity among the ambient lights having the at least two different frequencies, which can minimize the influence of the ambient light on the fingerprint data collected by the optical fingerprint sensor, so as to improve the accuracy of the fingerprint data obtained by the optical fingerprint collection.

Figure 7:
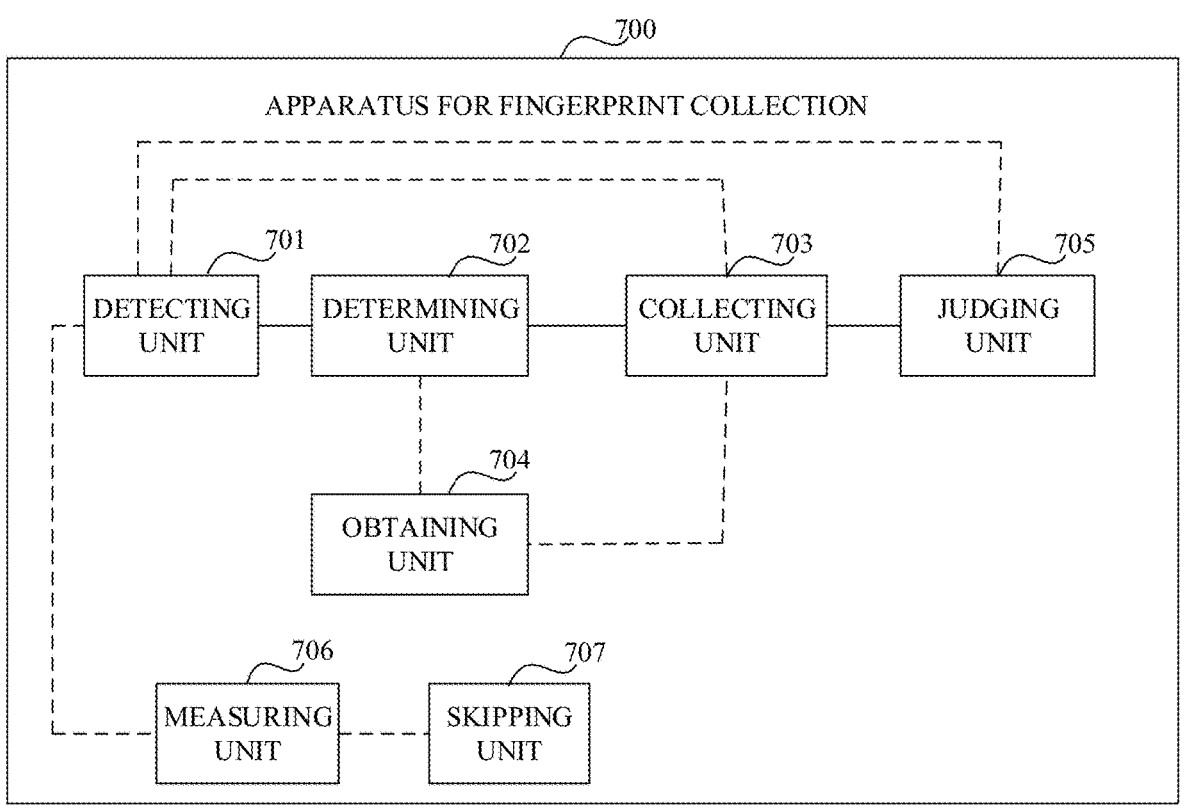
FIG. 7 is a schematic structural illustrating an apparatus for optical fingerprint collection according to an implementation of the disclosure.

FIG. 7 is a schematic structural illustrating an apparatus for optical fingerprint collection according to an implementation of the disclosure. As illustrate din FIG. 7, The apparatus 700 is applicable to a terminal including an application processor (AP), an optical sensor, and an optical fingerprint sensor. The optical fingerprint sensor includes an internal light source. The apparatus 700 includes a detecting unit 701, a determining unit 702, and a collecting unit 703.

The detecting unit 701 is configured to control, in response to a receipt of a fingerprint collection instruction by the terminal, the optical sensor to detect an intensity of each of ambient lights having at least two different frequencies among ambient lights at a current time point and send the intensity of each of the ambient lights having the at least two different frequencies to the AP. The determining unit 702 is configured to determine a target frequency, where the target frequency is a frequency of one of the ambient lights having the at least two different frequencies, and the one of the ambient lights has the lowest ambient light intensity among the ambient lights having the at least two different frequencies. The collecting unit 703 is configured to control the optical fingerprint sensor to collect fingerprint data when the internal light source is controlled to emit lights at least according to the target frequency.

In one example, the determining unit 702 is further configured to determine, via the AP, the lowest ambient light intensity among intensities of the ambient lights having the at least two different frequencies. The apparatus 700 further includes a obtaining unit 704. The obtaining unit 704 is configured to obtain, via the AP, a target light source intensity corresponding to the lowest ambient light intensity according to a correspondence relationship between ambient light intensities and light source intensities. The collecting unit 703 configured to control the optical fingerprint sensor to collect the fingerprint data when the internal light source is controlled to emit lights at least according to the target frequency is configured to control the optical fingerprint sensor to collect the fingerprint data when the internal light source is controlled to emit lights according to the target frequency and the target light source intensity.

In one example, the apparatus 705 further includes a judging unit 705. The judging unit 705 is configured to determine, via the AP, whether the fingerprint data matches preset fingerprint template data. The determining unit 702 is configured to determine that a fingerprint verification succeeds when the judging unit 705 determines that the fingerprint data matches the preset fingerprint template data.

In one implementation, the judging unit 705 is further configured to determine whether a total intensity of the ambient lights at the current time point is lower than a preset intensity. The detect unit 701 is configured to detect, via the AP, whether the current time point falls within a preset night-time interval based on a determination that the total intensity of the ambient lights at the current time point is lower than the preset intensity. The collecting unit 703 is configured to control the optical fingerprint sensor to collect the fingerprint data when the internal light source is controlled to emit lights at least according to the target frequency and the current time point falls within the preset night-time interval.

In one implementation, the terminal includes an angular velocity sensor. The apparatus 700 further includes a measuring unit 706 and a skipping unit 707. The measuring unit 706 is configured to measure, via the angular velocity sensor, an angular velocity of the terminal when the current time point fails to fall within the preset night-time interval. The skipping unit 707 is configured to skip execution of performing the control on the internal light source, when the angular velocity of the terminal is higher than a preset angular velocity.

According to the implementation of the disclosure, the control is performed on the internal light source to emit lights at least according to the frequency of one ambient light having the lowest ambient light intensity among the ambient lights having the at least two different frequencies so as to collect fingerprint data via the optical fingerprint sensor, which can minimize the influence of the ambient light on the fingerprint data collected by the optical fingerprint sensor, so as to improve the accuracy of the fingerprint data obtained by the optical fingerprint collection.

Figure 8:
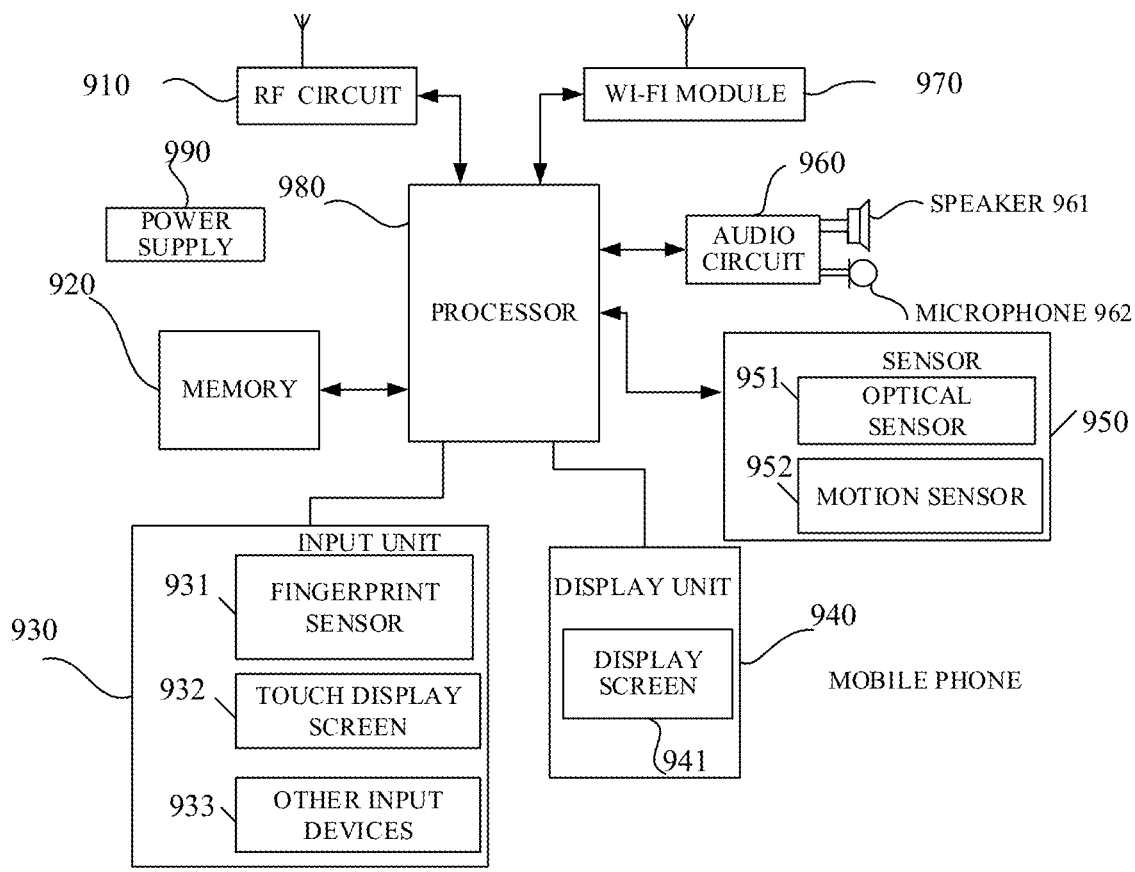
FIG. 8 is a schematic structural diagram illustrating a terminal according to another implementation of the disclosure.

Implementations of the disclosure also provide another terminal. As illustrated in FIG. 8, only parts related to implementations of the disclosure are illustrated for the convenience of description. For technical details not described, reference may be made to the method implementations of the disclosure. The terminal may be any terminal device, such as a mobile phone, a tablet PC, a personal digital assistant (PDA), a point of sale terminal (POS), an on-board computer, and the like. The following describes a mobile phone as an example of the terminal.

FIG. 8 is a block diagram illustrating a partial structure of a mobile phone related to a terminal according to an implementation of the disclosure. Referring to FIG. 8, the mobile phone includes a radio frequency (RF) circuit 910, a memory 920, an input unit 930, a display unit 940, a sensor 950, an audio circuit 960, a wireless fidelity (Wi-Fi) module 970, a processor 980, a power supply 990, and other components. Those skilled in the art can understand that the structure of the mobile phone illustrated in FIG. 8 does not constitute any limitation on a mobile phone. The mobile phone configured to implement technical solutions of the disclosure may include more or fewer components than illustrated, or may combine certain components, or may adopt different arrangements of components.

In the following, various components of the mobile phone will be described in detail with reference to FIG. 8.

The RF circuit 910 is configured to receive or transmit information. Generally, the RF circuit 910 includes but is not limited to an antenna, at least one amplifier, a transceiver, a coupler, a low noise amplifier (LNA), a duplexer, and the like. In addition, the RF circuit 910 may also communicate with the network or other devices via wireless communication. The wireless communication herein may use any communication standard or protocol, which includes but is not limited to global system of mobile communication (GSM), general packet radio service (GPRS), code division multiple access (CDMA), wideband code division multiple access (WCDMA), long term evolution (LTE), E-mail, short messaging service (SMS), and so on.

The memory 920 is configured to store software programs and modules. The processor 980 is configured to execute various function applications and data processing of the mobile phone by running the software programs and the modules stored in the memory 920. The memory 920 may mainly include a program storage area and a data storage area. The program storage area may store an operating system, applications required for at least one function, and the like. The data storage area may store data created according to the use of the smart phone, and the like. In addition, the memory 920 may include a high-speed random access memory (RAM), and may further include a non-transitory memory such as at least one disk storage device, a flash device, or other non-transitory solid-state storage devices.

The input unit 930 is configured to receive input digital or character information and generate key signal input associated with user setting and function control of the mobile phone. In one implementation, the input unit 930 may include a fingerprint sensor 931 (e.g., an optical fingerprint sensor), a touch display screen 932, and other input devices 933. The fingerprint sensor 931 can collect fingerprint data of the user. In addition to the fingerprint sensor 931, the input unit 930 may further include other input devices 933. In one implementation, other input devices 933 may include, but not limit to, one or more of a touch screen, a physical key, a function key (such as a volume control key, a switch key, etc.), a trackball, a mouse, a joystick, and the like.

The display unit 940 is configured to display information input by the user or information provided for the user or various menus of the mobile phone. The display unit 940 may include a display screen 941. In at least one implementation, the display screen 941 may be in the form of a liquid crystal display (LCD), an organic light-emitting diode (OLED), and so on. Although the fingerprint sensor 931 and the display screen 941 are illustrated as two separate components in FIG. 8 to realize the input and output functions of the mobile phone, in some embodiments, the fingerprint sensor 931 may be integrated with the display screen 941 to implement the input and output functions of the mobile phone.

The mobile phone may further include at least one sensor 950, such as a optical sensor 951, a motion sensor 952, and other sensors. The optical sensor 951 may include an ambient light sensor and a proximity sensor. The ambient light sensor may adjust brightness of the display screen 641 according to ambient lights. The proximity sensor may turn off the display screen 641 and/or backlight when the mobile phone reaches near the ear. As a kind of the motion sensor 952, an accelerometer sensor can detect the magnitude of acceleration in all directions (typically three axes), and when the mobile phone is stationary, the accelerometer sensor can detect the magnitude and direction of gravity; the accelerometer sensor can also be applied to applications for identifying mobile-phone gestures (such as vertical and horizontal screen switching, related games, magnetometer attitude calibration), or the accelerometer sensor can be used for vibration-recognition related functions (such as a pedometer, or a percussion) and so on. The mobile phone can also be equipped with an angular velocity sensor, a barometer, a hygrometer, a thermometer, an infrared sensor, and other sensors, and it will not be repeated herein.

The audio circuit 960, a speaker 961, and a microphone 962 may provide an audio interface between the user and the mobile phone. The audio circuit 960 may convert the received audio data into electrical signals and transfer the electrical signals to the speaker 961; thereafter the speaker 961 converts the electrical signals into sound signals for output. On the other hand, the microphone 962 converts the received sound signals into electrical signals, which will be received and converted into audio data by the audio circuit 960 to be output to the processor 980. The audio data is then processed and transmitted by the general-purpose processor 980 via the RF circuit 910 to another mobile phone for example, or the audio data is output to the memory 920 for further processing.

Wi-Fi belongs to a short-range wireless transmission technology. With aid of the Wi-Fi module 970, the mobile phone may assist the user in E-mail receiving and sending, webpage browsing, access to streaming media, and the like. Wi-Fi provides users with wireless broadband Internet access. Although the Wi-Fi module 970 is illustrated in FIG. 8, it should be understood that the Wi-Fi module 970 is not essential to the mobile phone and can be omitted according to actual needs without departing from the essential nature of the disclosure.

The processor 980 is a control center of the mobile phone. The processor 980 is configured to connect various parts of the entire smart phone through various interfaces and lines, and to execute various functions of the smart phone and process data by running or executing software programs and/or modules stored in the memory 920 and invoking data stored in the memory 920, thereby monitoring the smart phone as a whole. In at least one example, the processor 980 may include at least one core processing unit. For example, the processor 980 can be integrated with an application processor and a modem processor, where the application processor is mainly configured to handle and maintain an operating system, a user interface, applications, and so on, and the modem processor is mainly configured to process wireless communication. It will be appreciated that the modem processor mentioned above may not be integrated into the processor 980.

The mobile phone also includes a power supply 990 (e.g., a battery) that supplies power to various components. For instance, the power supply 990 may be logically coupled to the processor 980 via a power management system to achieve management of charging, discharging, and power consumption through the power management system.

Although not illustrated, a camera, a Bluetooth module, etc. may further be included in the mobile phone, which will not be elaborated herein.

Implementations of the disclosure also provide a computer storage medium. The computer storage medium is configured to store computer programs for electronic data interchange. The computer programs are operable with a computer to perform all or part of the operations of any of the methods described in the above method implementations Implementations of the disclosure also provide a computer program product. The computer program product includes a non-transitory computer-readable storage medium storing computer programs. The computer programs are operable with a computer to perform all or part of the operations of any of the methods described in the above method implementations.

It is to be noted that, for the sake of simplicity, the foregoing method implementations are described as a series of action combinations, however, it will be appreciated by those skilled in the art that the disclosure is not limited by the sequence of actions described. According to the present disclosure, certain steps or operations may be performed in other order or simultaneously. Besides, it will be appreciated by those skilled in the art that the implementations described in the specification are exemplary implementations and the actions and modules involved are not necessarily essential to the present disclosure.

In the foregoing implementations, the description of each implementation has its own emphasis. For the parts not described in detail in one implementation, reference may be made to related descriptions in other implementations.

In the implementations of the disclosure, it should be understood that, the apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored or not performed. In addition, coupling or communication connection between each illustrated or discussed component may be direct coupling or communication connection, or may be indirect coupling or communication connection among devices or units via some interfaces, and may be electrical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various implementations of the present disclosure. The memory includes various medium capable of storing program codes, such as a universal serial bus (USB) flash disk, a read-only memory (ROM), a random access memory (RAM), a removable hard disk, Disk, compact disc (CD), or the like.

It will be understood by those of ordinary skill in the art that all or a part of the various methods of the implementations described above may be accomplished by means of a program to instruct associated hardware, the program may be stored in a computer-readable memory, which may include a flash memory, a ROM, a RAM, a disk or a CD, and so on.

The foregoing illustrates the implementations of the present disclosure in detail. The principle and implementations of the present disclosure are illustrated by specific examples. The illustration of the above implementations are merely used to facilitate understanding of the methods and core concept of the present disclosure. For a person skilled in the art, according to the concept of the present disclosure, specific implementations and application ranges may be both changed. Based on the above, the present disclosure shall not be understood to be limited to the specification.

What is claimed is:

1. A method for fingerprint collection, comprising:
determining, in response to receiving a fingerprint collection instruction, an intensity of each of ambient lights having at least two different frequencies at a current time point via an optical sensor of a terminal;
determining a target frequency, the target frequency being a frequency of one ambient light having a lowest ambient light intensity among the ambient lights having the at least two different frequencies; and
controlling light emission of an internal light source of an optical fingerprint sensor of the terminal at least according to the target frequency so as to collect fingerprint data via the optical fingerprint sensor.

2. The method of claim 1, further comprising:
obtaining a target light source intensity corresponding to the lowest ambient light intensity according to a correspondence relationship between ambient light intensities and light source intensities; and
controlling the light emission of the internal light source at least according to the target frequency including:
controlling the light emission of the internal light source according to the target frequency and the target light source intensity.

3. The method of claim 2, wherein the correspondence relationship between the ambient light intensities and the light source intensities is a proportional relationship.

4. The method of claim 1, further comprising:
determining whether a match between the fingerprint data and preset fingerprint template data exists; and
determining that a fingerprint verification succeeds in response to the match between the fingerprint data and the preset fingerprint template data.

5. The method of claim 1, further comprising:
determining whether a total intensity of the ambient lights at the current time point is lower than a preset intensity;
detecting whether the current time point falls within a preset night-time interval based on a determination that the total intensity of the ambient lights at the current time point is lower than the preset intensity; and
controlling the light emission of the internal light source at least according to the target frequency, upon detecting that the current time point falls within the preset night-time interval.

6. The method of claim 5, further comprising:
determining, an angular velocity of the terminal via an angular velocity sensor of the terminal upon detecting that the current time point fails to fall within the preset night-time interval; and
skipping execution of controlling the light emission of the internal light source at least according to the target frequency, upon detecting that the angular velocity of the terminal is higher than a preset angular velocity.

7. The method of claim 6, further comprising:
controlling the light emission of the internal light source at least according to the target frequency, upon detecting that the angular velocity of the terminal is lower than or equal to the preset angular velocity.

8. A terminal, comprising:
an optical sensor configured to detect, in response to receiving a fingerprint collection instruction, an intensity of each of ambient lights having at least two different frequencies at a current time point;
an application processor (AP), configured to determine a target frequency, the target frequency being a frequency of one ambient light having a lowest ambient light intensity among the ambient lights having the at least two different frequencies; and
an optical fingerprint sensor comprising an internal light source and configured to collect fingerprint data when the internal light source is controlled by the AP to emit lights at least according to the target frequency.

9. The terminal of claim 8, wherein:
the AP is further configured to obtain a target light source intensity corresponding to the lowest ambient light intensity according to a correspondence relationship between ambient light intensities and light source intensities; and
collecting the fingerprint data when the internal light source is controlled by the AP to emit the lights at least according to the target frequency includes:
collecting the fingerprint data when the internal light source is controlled by the AP to emit the lights according to the target frequency and the target light source intensity.

10. The terminal of claim 9, wherein the correspondence relationship between the ambient light intensities and the light source intensities is a proportion relationship.

11. The terminal of claim 8, wherein:
the AP is further configured to determine whether a match between the fingerprint data and preset fingerprint template data exists; and
the AP is further configured to determine that a fingerprint verification succeeds in response to the match between the fingerprint data and the preset fingerprint template data.

12. The terminal of claim 8, wherein:
the AP is further configured to determine whether a total intensity of the ambient lights at the current time point is lower than a preset intensity;
the AP is further configured to detect whether the current time point falls within a preset night-time interval based on a determination that the total intensity of the ambient lights at the current time point is lower than the preset intensity; and
the optical fingerprint sensor is further configured to collect the fingerprint data when the internal light source is controlled by the AP to emit the lights at least according to the target frequency, upon detecting that the current time point falls within the preset night-time interval.

13. The terminal of claim 12, further comprising:
an angular velocity sensor configured to measure an angular velocity of the terminal upon detecting that the current time point fails to fall within the preset night-time interval; and
wherein the AP is further configured to skip execution of performing the control on the internal light source of the optical fingerprint sensor when the angular velocity of the terminal detected by the angular velocity sensor is higher than a preset angular velocity.

14. The terminal of claim 13, wherein:
the AP is further configured to perform the control on the internal light source when the angular velocity of the terminal detected by the angular velocity sensor is lower than or equal to the preset angular velocity.

15. A non-transitory computer readable storage medium, configured to store executable program codes, wherein the executable program codes, when executed, are operable with a processor to:
determine, in response to a receipt of a fingerprint collection instruction, an intensity of each of ambient lights having at least two different frequencies at a current time point via an optical sensor of a terminal;
determine a target frequency, the target frequency being a frequency of one ambient light having a lowest ambient light intensity among the ambient lights having the at least two different frequencies; and
control light emission of an internal light source of an optical fingerprint sensor of the terminal at least according to the target frequency so as to collect fingerprint data via an optical fingerprint sensor.

16. The terminal of claim 15, wherein the executable program codes are further operable with the processor to:
obtain a target light source intensity corresponding to the lowest ambient light intensity according to a correspondence relationship between ambient light intensities and light source intensities; and
wherein controlling the light emission of the internal light source at least according to the target frequency includes:
controlling the light emission of the internal light source according to the target frequency and the target light source intensity.

17. The terminal of claim 15, wherein the executable program codes are further operable with the processor to:
determine whether a match between the fingerprint data and preset fingerprint template data exists; and
determine that a fingerprint verification succeeds in response to the match between the fingerprint data and the preset fingerprint template data.

18. The terminal of claim 15, wherein the executable program codes are further operable with the processor to:
determine whether a total intensity of the ambient lights at the current time point is lower than a preset intensity;
detect whether the current time point falls within a preset night-time interval based on a determination that the total intensity of the ambient lights at the current time point is lower than the preset intensity; and
control the light emission of the internal light source at least according to the target frequency, when the current time point falls within the preset night-time interval.

19. The terminal of claim 18, wherein the executable program codes are further operable with the processor to:
determine an angular velocity of the terminal via an angular velocity sensor of the terminal when the current time point fails to fall within the preset night-time interval; and
skip execution of controlling the light emission of the internal light source at least according to the target frequency, when the angular velocity of the terminal is higher than a preset angular velocity.

20. The terminal of claim 19, wherein the executable program codes are further operable with the processor to:
control the light emission of the internal light source at least according to the target frequency, when the angular velocity of the terminal is lower than or equal to the preset angular velocity.

* * * * *